(12) United States Patent
Kubo et al.

(10) Patent No.: US 7,781,367 B2
(45) Date of Patent: Aug. 24, 2010

(54) EXHAUST GAS CLEANING CATALYST AND PROCESS FOR PRODUCING THE SAME

(75) Inventors: Hitoshi Kubo, Tsukuba (JP); Shunji Kikuhara, Tsukuba (JP); Ataru Daido, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 28 days.

(21) Appl. No.: 12/162,159

(22) PCT Filed: Nov. 13, 2007

(86) PCT No.: PCT/JP2007/071989

§ 371 (c)(1),
(2), (4) Date: Jul. 25, 2008

(87) PCT Pub. No.: WO2008/069003

PCT Pub. Date: Jun. 12, 2008

(65) Prior Publication Data

US 2009/0011177 A1   Jan. 8, 2009

(30) Foreign Application Priority Data

Dec. 5, 2006  (JP) ............................ P2006-327782

(51) Int. Cl.
*B01J 23/42* (2006.01)
*B32B 15/02* (2006.01)
(52) U.S. Cl. .................................... 502/339; 428/402
(58) Field of Classification Search ................. 502/339; 428/116, 402
See application file for complete search history.

(56) References Cited

U.S. PATENT DOCUMENTS

2006/0240977 A1 * 10/2006 Nochi et al. ................ 502/300

FOREIGN PATENT DOCUMENTS

| JP | 09-323039 | 12/1997 |
| JP | 2000-015096 | 1/2000 |
| JP | 2005-169280 | * 6/2005 |
| JP | 2005-296733 | * 10/2005 |

OTHER PUBLICATIONS

International Preliminary Report on Patentability for PCT/JP2007/071989 (report issued Jun. 10, 2009).*

* cited by examiner

*Primary Examiner*—Timothy C Vanoy
*Assistant Examiner*—Daniel Berns
(74) *Attorney, Agent, or Firm*—Roberts & Roberts, LLP

(57) ABSTRACT

The present invention relates to an exhaust gas cleaning catalyst, and aiming at providing a catalyst which has a higher catalytic activity than that of conventional catalysts and, in particular, a strong ability to oxidize nitrogen monoxide. The present invention relates to an exhaust gas cleaning catalyst whose catalytic component is supported on a carrier, characterized in that the catalytic component is platinum colloid which has an average particle size of 80 nm to 120 nm, a particle size $D_{20}$, a 20% cumulative particle size distribution from smaller particle size side, of 50 nm or more, and a particle size $D_{90}$, a 90% cumulative particle size distribution from smaller particle size side, of 200 nm or less. The exhaust gas cleaning catalyst of the present invention has a high catalytic activity for cleaning exhaust gases and, in particular, a strong ability to oxidize nitrogen monoxide.

19 Claims, 3 Drawing Sheets

EXHAUST GAS CLEANING CATALYST AND PROCESS FOR PRODUCING THE SAME

TECHNICAL FIELD

The present invention relates to an exhaust gas cleaning catalyst and a process for producing the same and more particularly to a catalyst for cleaning nitrogen oxides in exhaust gases.

BACKGROUND ART

Exhaust gas cleaning catalysts whose catalytic component is supported on a honeycomb structure or a filter have been widely used for cleaning the exhaust gases from diesel engines or gasoline engines. For example, in the case that an exhaust gas contains nitrogen oxides, an exhaust gas cleaning catalyst is used which oxidizes nitrogen monoxide in nitrogen oxides to nitrogen dioxide. And it has been known that such nitrogen dioxide assumes the role of oxidizing the soot etc. in the exhaust gas when reduced to nitrogen. A precious metal such as platinum, palladium or rhodium, or the oxide thereof can be used as a catalytic component for such an exhaust gas cleaning catalyst and platinum has been particularly often used.

Exhaust gas cleaning catalysts whose catalytic component is platinum can be produced by a process in which a solution containing a platinum compound is brought into contact with a carrier. Specifically, platinum can be supported on a carrier by a process in which a solution containing excess platinum is brought into contact with a carrier, dried, followed by baking to force platinum to deposit on the carrier, or by a process in which a carrier is impregnated with a solution that contains platinum in an amount equal to or more than the amount of saturated adsorption of the carrier to allow the carrier to adsorb platinum until equilibrium is established.

Patent Document 1 discloses an exhaust gas cleaning catalyst which is used for the cleaning of nitrogen oxides and whose catalytic component is platinum and carrier is γ-alumina. In this exhaust gas cleaning catalyst, platinum is supported on γ-alumina by impregnating γ-alumina with an aqueous solution of chloroplatinic acid, drying at 100° C. for 12 hours, followed by baking at 500° C. (Patent Document 1, Preparation Example 1).

Patent Document 1: Specification of Japanese Patent No. 3791968

DISCLOSURE OF THE INVENTION

Problems to be Solved by the Invention

Recent increased public concern about environmental problems has led to high hopes for improvement in catalytic activity of exhaust gas cleaning catalysts. Thus, the catalytic activity of conventional exhaust gas cleaning catalysts has been improved by heat-treating the catalysts right after platinum supporting at high temperatures or by increasing the amount of the catalytic component to be supported. However, even in cases where such treatment was done, there was a limit to the improvement in catalytic activity.

Accordingly, the present invention relates to an exhaust gas cleaning catalyst. And it is the object of the present invention to provide a catalyst that has higher catalytic activity than that of conventional catalysts and, in particular, a strong ability to oxidize nitrogen monoxide.

Means for Solving the Problems

To overcome the above described problem, the present inventors directed tremendous research effort toward improving the catalytic activity of exhaust gas cleaning catalysts. A method in which the particle size of a catalytic component is decreased is commonly known as a method of increasing the specific surface area of a catalytic component and ensuring a large reaction area of a catalyst. However, the present inventors have discovered that to ensure a sufficient amount of catalytic activity of an exhaust gas cleaning catalyst, the catalytic component needs to have an average particle size of 80 nm or more. They have further discovered that if the catalytic component has an average particle size of 120 nm or less, the least necessary contact area of the catalytic component and an exhaust gas can be ensured. Further, they have discovered that in catalysts, the narrower variation in particle size distribution becomes, the stronger their ability of oxidizing nitrogen monoxide becomes.

Specifically, the present invention relates to an exhaust gas cleaning catalyst whose catalytic component is supported on a carrier, characterized in that the catalytic component is platinum colloid which has an average particle size of 80 nm to 120 nm, a particle size $D_{20}$, a 20% cumulative particle size distribution from smaller particle size side, of 50 nm or more, and a particle size $D_{90}$, a 90% cumulative particle size distribution from smaller particle size side, of 200 nm or less. Preferably, the average particle size of the catalytic component is 90 to 110 nm, $D_{20}$ is 60 nm or more, and $D_{90}$ is 140 nm or less.

In conventional exhaust gas cleaning catalysts, it is difficult to allow the catalytic component to have a large average particle size, and besides, variations in particle size distribution are more likely to occur. For example, in a catalyst which is prepared by impregnating a carrier with a platinum-containing solution and allowing the carrier to adsorb platinum until equilibrium is established, variations in particle size distribution of catalyst particles are relatively small, but the average particle size is as small as about 1 to 5 nm. The average particle size of this catalyst is about 40 nm even in the case that the catalyst particles are grown by high-temperature baking at 800° C. or more. In a catalyst which is prepared by forcing platinum to deposit on a carrier using a solution that contains excess platinum, though the average particle size is as relatively large as several tens nm to several hundreds nm, there are great variations in particle size distribution.

In contrast, in the exhaust gas cleaning catalyst of the present invention in which platinum colloid having an average particle size of 80 nm to 120 nm, $D_{20}$ of 50 nm or more, and $D_{90}$ of 200 nm or less is supported on a carrier, the particle size is larger and variations in particle size distribution are smaller, compared with those of conventional catalysts. It has also been found that the exhaust gas cleaning catalyst of the present invention exhibits a higher catalytic activity, particularly in terms of the ability to oxidize nitrogen monoxide, compared with conventional exhaust gas cleaning catalysts. $D_{20}$ and $D_{90}$ in the present invention express cumulative particle size distribution, on a particle number basis, from smaller particle size side.

The amount of the above catalytic component supported is preferably 0.5 to 5 g/L by mass of Pt per carrier volume. If the amount is within this range, an exhaust gas cleaning catalyst having a sufficiently high catalytic activity can be obtained.

For the carrier used in the present invention, at least part of its surface which comes in contact with the catalytic component is preferably an oxide. This ensures a sufficient surface area for bringing the catalytic component into contact with exhaust gases. Specifically, a ceramic honeycomb or metal honeycomb structure or a filter can be used as a carrier. Ceramic honeycomb structures usable in the present invention include those prepared using cordierite or silicon carbide (SiC).

A structure or a filter prepared by wash-coating at least part of the above described structure or filter can also be used as a carrier. "Wash coat" means "to coat an oxide ceramic having a large surface area". Alumina, silica, titania or zirconia, which is an oxide ceramic, can be used for wash coating. If a carrier undergoes wash coating, the surface area of the carrier can be sufficiently increased, and the catalytic component and exhaust gases can be brought into sufficient contact with each other. Preferably, wash coating is performed using an oxide ceramic in an amount of 1 g/L to 200 g/L per structure or filter. If wash coating is performed using an oxide ceramic in an amount within this range, a sufficient surface area can be ensured without excess pressure drop in the using an oxide ceramic.

The exhaust gas cleaning catalyst of the present invention described so far can be produced by a process, comprising: a step of reducing a solution of a platinum salt with a reducing agent to form a nuclear colloid; a step of growing the nuclear colloid with a reducing agent to form platinum colloid, and a step of bringing the platinum colloid into contact with a carrier, wherein the reduction in the step of forming a nuclear colloid is performed at pH 1 to 7.

In the production process of the present invention, reduction for forming platinum colloid is performed in a stepwise manner in the following two steps: a step of forming a nuclear colloid; and a step of growing the nuclear colloid, whereby platinum colloid having a large average particle size and small variations in particle size distribution can be formed. A catalyst having an improved catalytic performance of cleaning exhaust gases can be obtained by bringing platinum colloid having a controlled particle size and particle size distribution into contact with a carrier. The reduction in the step of forming a nuclear colloid is performed at pH 1 to 7, preferably at pH 3 or more, and more preferably at pH 3 to 4. If pH is too low, the platinum colloid is less likely to take the form of particles, whereas if pH is too high, platinum is more likely to agglomerate and sometimes precipitates.

Examples of platinum salts usable in the formation of platinum colloid include: platinous chloride, platinic chloride, dinitroammine platinum, platinum oxide, ethanolamine platinum, acetylacetonato platinum, hexaammine platinum chloride, and tetraammine platinum chloride. Examples of reducing agents usable in the step of forming a nuclear colloid or in the step of growing the nuclear colloid include: sodium boron hydride, ammonium and hydrazine compounds, and besides, alcohols, hydrogen gas or carbon monoxide gas, saccharides or fats, and reducing ability of ultrasonics. Using sodium boron hydride is particularly preferable. In the step of forming a nuclear colloid, preferably a surfactant is added as a protecting agent. Examples of surfactants usable in the above step include: poly(vinylpyrrolidone) (PVP), poly (acrylic acid) (PAA), polyethylene imine (PEI), and polyethylene glycol (PEG). The molecular weight of the surfactant used is preferably 300 to 50000 and more preferably 1000 to 30000.

BEST MODE FOR CARRYING OUT THE INVENTION

Figure 1:
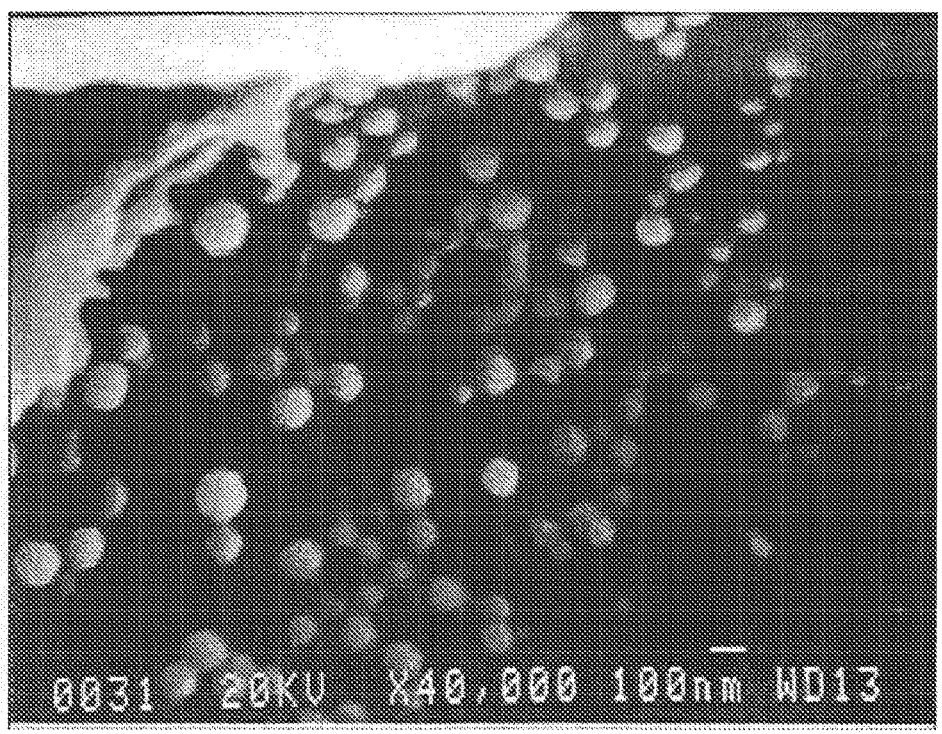
FIG. 1 is an SEM micrograph of an exhaust gas cleaning catalyst of Example 1.
Figure 2:
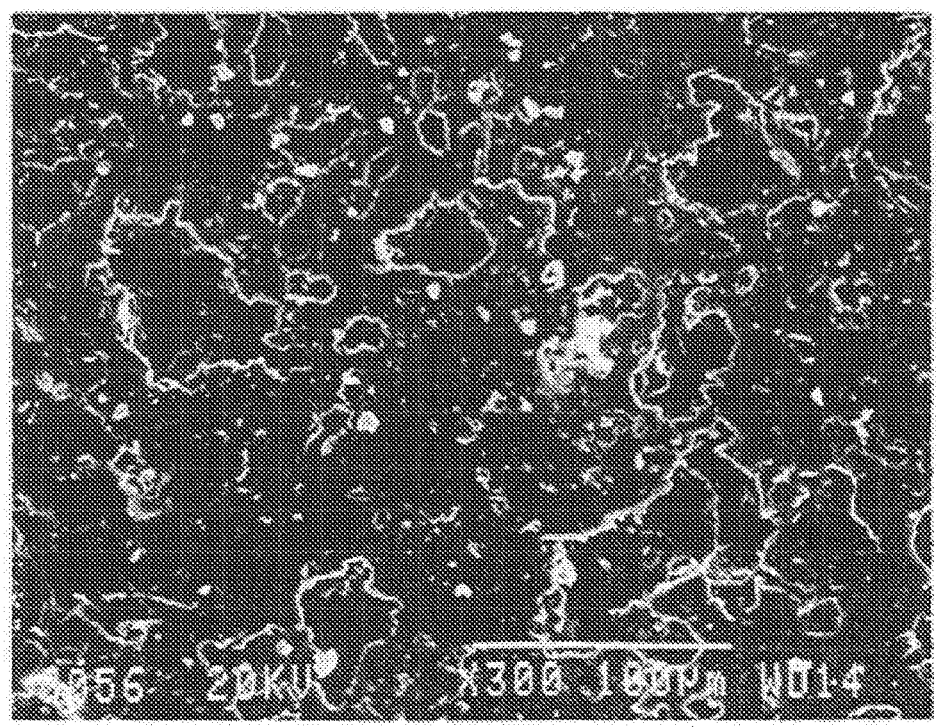
FIG. 2 is an SEM micrograph of an exhaust gas cleaning catalyst of Comparative Example 2.
Figure 3:
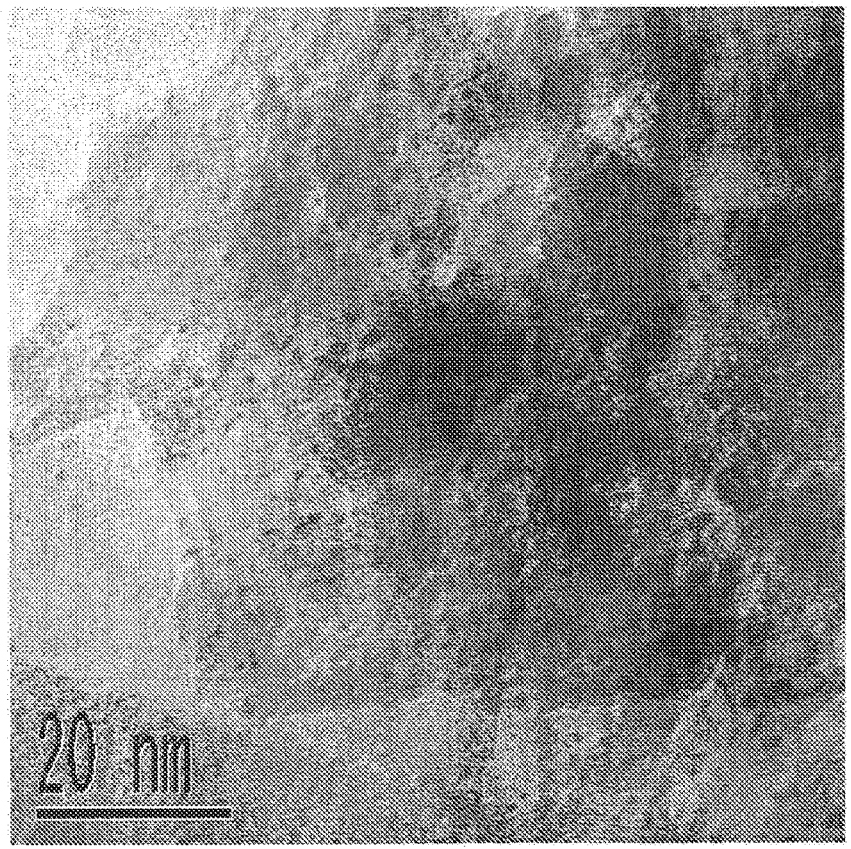
FIG. 3 is a TEM micrograph of an exhaust gas cleaning catalyst of Comparative Example 3.
Figure 4:
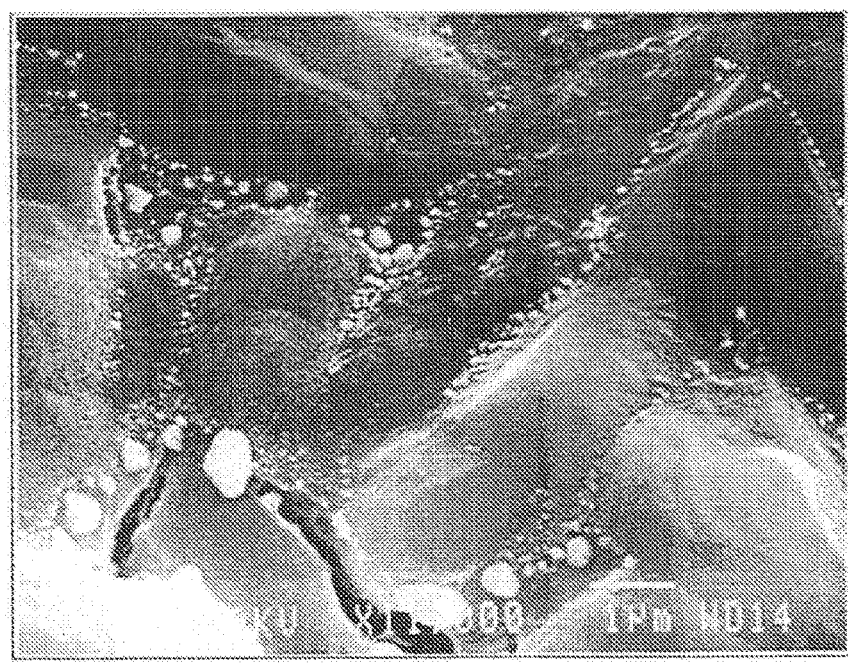
FIG. 4 is an SEM micrograph of an exhaust gas cleaning catalyst of Comparative Example 4.

In the following the best mode for carrying out the present invention will be described.

Example 1

To 77.2 g of an aqueous solution of dinitroammine Pt having a Pt content of 8 wt %, 500 g of water and 13 g of polyethylene glycol having a molecular weight of 1000 were added and stirred. Then, reduction treatment was performed by adding 4 g of a 98% aqueous solution of hydrazine monohydrate, as a reducing agent, to the mixed solution to form a nuclear colloid. To this nuclear colloid, 250 ml of a 2% aqueous solution of hydrazine monohydrate, as a reducing agent, was added at a rate of 5 ml/min, and the nuclear colloid was allowed to grow at room temperature for 4 hours, while being stirred, to form a colloidal solution of platinum.

Used as a carrier was a honeycomb having γ-alumina deposited on its surface in an amount of 100 g/L, which was prepared by wash-coating γ-alumina on a cordierite (ceramic) honeycomb 7.5 inch in diameter, 8 inch in length and 5.79 L in volume, drying the same at 120° C. overnight, followed by baking at 500° C. for 2 hours. The carrier was impregnated with the colloidal solution of platinum obtained by the above process, dried at 120° C. overnight, followed by baking at 500° C. for 2 hours to produce an exhaust gas cleaning catalyst (A-1) in which the amount of the catalytic component supported was 1 g/L in terms of the mass of Pt per carrier volume.

Example 2

An exhaust gas cleaning catalyst (A-2) in which the amount of the catalytic component supported was 1 g/L in terms of the mass of Pt per carrier volume was produced by the same process as that of Example 1, except that the colloidal solution of platinum was prepared using 3.5 g of polyethylene glycol having a molecular weight of 4000 and that a honeycomb having γ-alumina deposited on its surface in an amount of 10 g/L was used as the carrier.

Comparative Example 1

The same carrier as that of Example 1 was impregnated with a platinum solution prepared by adding 500 g of water to 38.6 g of an aqueous solution of platinum chloride having a Pt content of 15 wt %, dried at 120° C. overnight, followed by baking at 500° C. for 2 hours to produce an exhaust gas cleaning catalyst (B-1) in which the amount of the catalytic component supported was 1 g/L in terms of the mass of Pt per carrier volume.

Comparative Example 2

The catalyst obtained in Comparative Example 1 was further baked at 900° C. for 2 hours to produce an exhaust gas cleaning catalyst (B-2) in which the amount of the catalytic component supported was 1 g/L in terms of the mass of Pt per carrier volume.

Comparative Example 3

The same carrier as that of Example 1 was impregnated with a solution of: 77.2 g of an aqueous solution of dinitroammine platinum having a platinum content of 8 wt %; and 20 kg of water, and stirred at 250 rpm for 10 hours to allow γ-alumina to adsorb platinum ions. Then the carrier was dried at 120° C. overnight, followed by baking at 500° C. for 2 hours to produce an exhaust gas cleaning catalyst (C-1) in which the amount of the catalytic component supported was 1 g/L in terms of the mass of Pt per carrier volume.

Comparative Example 4

The catalyst obtained in Comparative Example 1 was further baked at 900° C. for 2 hours to produce an exhaust gas cleaning catalyst (C-2) in which the amount of the catalytic component supported was 1 g/L in terms of the mass of Pt per carrier volume.

[Measurement of Particle Size]

Each of the exhaust gas cleaning catalysts of Examples and Comparative Examples was observed using SEM micrographs, and particle size distribution of about 500 platinum particles was measured on a particle number basis. The exhaust gas cleaning catalyst of Comparative Example 3 was observed using a TEM micrograph. FIG. 1 to FIG. 4 show the SEM micrographs or TEM micrograph. Table 1 shows the average particle size $D_{20}$, $D_{90}$ calculated from each particle size distribution.

[Oxidation Conversion of Nitrogen Oxides]

Figure 5:
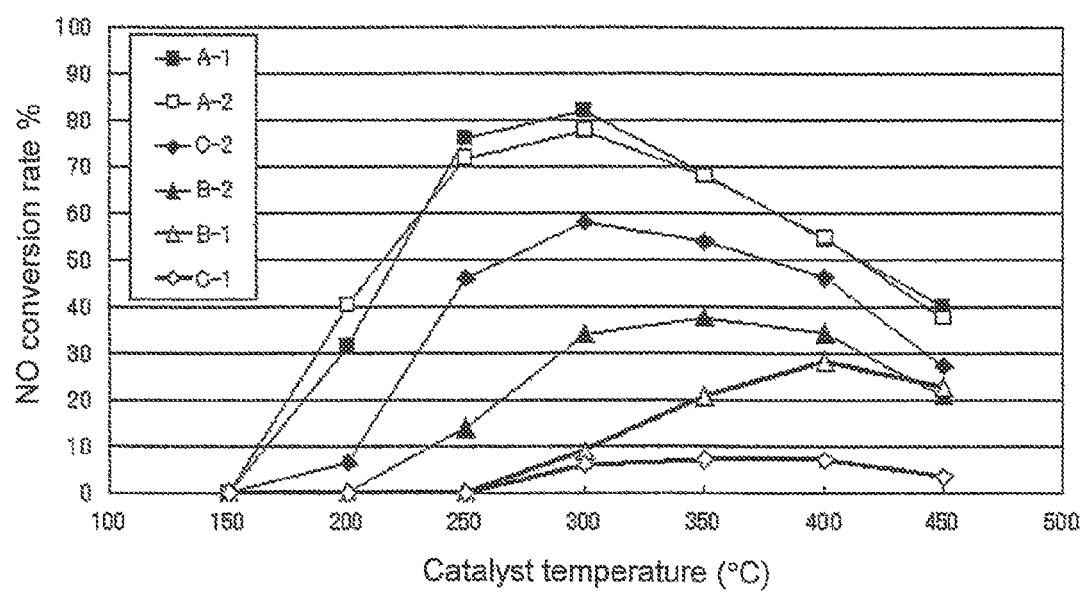
FIG. 5 is a graph illustrating the rate of the oxidation conversion of nitrogen oxides using exhaust gas cleaning catalysts of Examples and Comparative Examples.

The rate of the oxidation conversion of nitrogen monoxide in an exhaust gas to nitrogen dioxide of the catalysts of Examples and Comparative Examples was measured with a bench test instrument of diesel engine. The gas composition at the time of measurement was: 1000 ppm NO, 10 vol % $O_2$, 6 vol % $H_2O$ and the remainder $N_2$. The space velocity was 35000 $h^{-1}$. The measurement of conversion was made at reaction temperatures of 150, 200, 250, 300, 350, 400 and 450° C. FIG. 5 shows the results.

TABLE 1

|  | Average particle size (mm) | $D_{20}$ (mm) | $D_{90}$ (mm) |
| --- | --- | --- | --- |
| Example 1 | 93 | 63 | 119 |
| Example 2 | 105 | 76 | 135 |
| Comparative Example 2 | 271 | 80 | 555 |
| Comparative Example 4 | 17 | 8 | 24 |

Table 1 shows that in the exhaust gas cleaning catalysts of Examples 1 and 2, the average particle size of their platinum particles was within the range of 80 nm to 120 nm, $D_{20}$ was 50 nm or more, and $D_{90}$ was 200 nm or smaller. In contrast, in the exhaust gas cleaning catalyst of Comparative Example 2, though the average particle size was large, the difference between $D_{20}$ and $D_{90}$ was large and there was a variation in the particle size distribution. In the exhaust gas cleaning catalyst of Comparative Example 4, the average particle size was as small as less than 80 nm.

It is apparent from FIG. 5, in Example 1 (A-1) and Example 2 (A-2) in which platinum colloid was supported on a carrier, the conversion rate was higher, at any temperature, than that of Comparative Examples 1 to 4 and the conversion rate at a catalyst temperature of 300° C. was nearly 80%. In contrast, in Comparative Example 1 (B-1) and Comparative Example 3 (C-1), the rate of the oxidation conversion of nitrogen monoxide was lower compared with that of Examples 1 (A-1) and 2 (A-2) and even in Comparative Example 2 (B-2) and Comparative Example 4 (C-2) which underwent baking at a high temperature, the conversion rate at a catalyst temperature of 300° C. was as low as less than 60%.

INDUSTRIAL APPLICABILITY

As described so far, the exhaust gas cleaning catalyst of the present invention has a high catalytic activity for cleaning exhaust gases and, in particularly, a strong ability to oxidize nitrogen monoxide.

The invention claimed is:

1. An exhaust gas cleaning catalyst comprising a catalytic component which is supported on a carrier, wherein the catalytic component is a platinum colloid which has an average particle size of 80 nm to 120 nm, a particle size $D_{20}$, a 20% cumulative particle size distribution from a smaller particle side, of 50 nm or more, and a particle size $D_{90}$, a 90% cumulative particle size distribution from a smaller particle size side, of 200 nm or less.

2. The exhaust gas cleaning catalyst according to claim 1, wherein the amount of catalytic component supported on the carrier is 0.5 to 5 g/l in terms of the mass of platinum per carrier volume.

3. The exhaust gas cleaning catalyst according to claim 1, wherein at least part of the carrier surface which the catalytic component comes into contact with is an oxide.

4. The exhaust gas cleaning catalyst according to claim 1, wherein the carrier is a ceramic honeycomb or metal honeycomb structure, or a filter, or at least part of the ceramic honeycomb or metal honeycomb structure or filter has been wash coated.

5. A process for producing an exhaust gas cleaning catalyst, which exhaust gas cleaning catalyst comprises a catalytic component which is supported on a carrier, wherein the catalytic component is a platinum colloid which has an average particle size of 80 nm to 120 nm, a particle size $D_{20}$, a 20% cumulative particle size distribution from a smaller particle size side, of 50 nm or more, and a particle size $D_{90}$, a 90% cumulative particle size distribution from a smaller particle size side, of 200 nm or less, the process comprising:

a step of adding a protective agent having a molecular weight of 300 to 50,000 and adding a reducing agent at pH of 3 to 4 to a solution of a platinum salt to form a nuclear colloid, wherein the protective agent is a surfactant selected from polyacrylic acid, polyethylene imine, and polyethylene glycol;

a step of growing the nuclear colloid with a reducing agent to form platinum colloid; and a step of bringing the platinum colloid into contact with a carrier.

6. The exhaust gas cleaning catalyst according to claim 2, wherein at least part of the carrier surface which the catalytic component comes into contact with is an oxide.

7. The exhaust gas cleaning catalyst according to claim 2, wherein the carrier is a ceramic honeycomb or metal honeycomb structure, or a filter, or at least part of the ceramic honeycomb or metal honeycomb structure or filter has been wash coated.

8. The exhaust gas cleaning catalyst according to claim 3, wherein the carrier is a ceramic honeycomb or metal honeycomb structure, or a filter, or at least part of the ceramic honeycomb or metal honeycomb structure or filter has been wash coated.

9. The exhaust gas cleaning catalyst according to claim 6, wherein the carrier is a ceramic honeycomb or metal honeycomb structure, or a filter, or at least part of the ceramic honeycomb or metal honeycomb structure or filter has been wash coated.

10. The process of claim 5 wherein in the exhaust gas cleaning catalyst, the amount of catalytic component supported on the carrier is 0.5 to 5 g/l in terms of the mass of platinum per carrier volume.

11. The process of claim 5 wherein at least part of the carrier surface which the catalytic component comes into contact with is an oxide.

12. The process of claim 10 wherein at least part of the carrier surface which the catalytic component comes into contact with is an oxide.

13. The process of claim 5 wherein the carrier is a ceramic honeycomb or metal honeycomb structure, or a filter, or at least part of the ceramic honeycomb or metal honeycomb structure or filter has been wash coated.

14. The process of claim 10 wherein the carrier is a ceramic honeycomb or metal honeycomb structure, or a filter, or at least part of the ceramic honeycomb or metal honeycomb structure or filter has been wash coated.

15. The process of claim 11 wherein the carrier is a ceramic honeycomb or metal honeycomb structure, or a filter, or at least part of the ceramic honeycomb or metal honeycomb structure or filter has been wash coated.

16. The process of claim 12 wherein the carrier is a ceramic honeycomb or metal honeycomb structure, or a filter, or at least part of the ceramic honeycomb or metal honeycomb structure or filter has been wash coated.

17. The process of claim 5 wherein the platinum salt comprises platinous chloride, platinic chloride, dinitroammine platinum, platinum oxide, ethanolamine platinum, acetylacetonato platinum, hexamine platinum chloride, or tetraammine platinum chloride.

18. The process of claim 5 wherein the reducing agent comprises sodium boron hydride, ammonium compounds, hydrazine compounds, alcohols, hydrogen gas, carbon monoxide gas, saccharides or fats.

19. The process of claim 5 wherein the step of growing the nuclear colloid with a reducing agent comprises adding a surfactant.

* * * * *